United States Patent [19]

Le Cheviller et al.

[11] Patent Number: 4,669,109
[45] Date of Patent: May 26, 1987

[54] TELEPHONE APPARATUS WITH A FIXED TELEPHONE STATION COUPLED TO A MOBILE AND DETACHABLE HANDSET

[76] Inventors: Jean-Pierre Le Cheviller, 5 rue Leredde, 75013 Paris; Jean Duquesne, 32 rue LaFontaine, 75016 Paris; René 46 rue Grange Dawe Rose Dupuy, 92360 Heudon la Foret, all of, France

[21] Appl. No.: 832,175

[22] Filed: Feb. 24, 1986

[30] Foreign Application Priority Data

Feb. 26, 1985 [FR] France ............................... 85 02759

[51] Int. Cl.$^4$ ............................................. H04B 5/02
[52] U.S. Cl. ...................................... 379/143; 379/58; 455/41
[58] Field of Search ........... 179/81 R, 82, 2 E, 2 EA, 179/2 EB, 2 EC; 235/449, 450, 470, 472; 455/41

[56] References Cited

U.S. PATENT DOCUMENTS

| | | | |
|---|---|---|---|
| 1,558,179 | 12/1985 | Yasuda et al. ....................... | 179/2 E |
| 4,462,113 | 7/1984 | Iwata ................................... | 455/20 |
| 4,515,994 | 5/1985 | Kolle et al. ......................... | 179/2 R |
| 4,550,444 | 10/1985 | Uerel .................................... | 455/41 |
| 4,584,707 | 4/1986 | Goldberg et al. .................... | 455/41 |
| 4,595,795 | 6/1986 | Endo ................................... | 179/2 EA |

*Primary Examiner*—Robert Lev
*Attorney, Agent, or Firm*—Laubscher & Laubscher

[57] ABSTRACT

A telephone apparatus, such as a public telephone, in which a voice and tone signals transmitting medium between a fixed station connected to a telephone line and a handset detachable from the station is free of disturbance. A modulation circuit for transmitting voice and tone signals from the telephone line to the handset and a demodulation circuit for transmitting voice signals from the handset to the telephone line are included in the station and are connected respectively to a demodulation circuit connected to an earphone of the handset and to a modulation circuit connected to a microphone of the handset, via two low frequency magnetic coupling coils. The circuits contained in the handset are remote supplied by a power supply circuit included in the station, via third magnetic coupling coils.

12 Claims, 4 Drawing Figures

FIG. 3
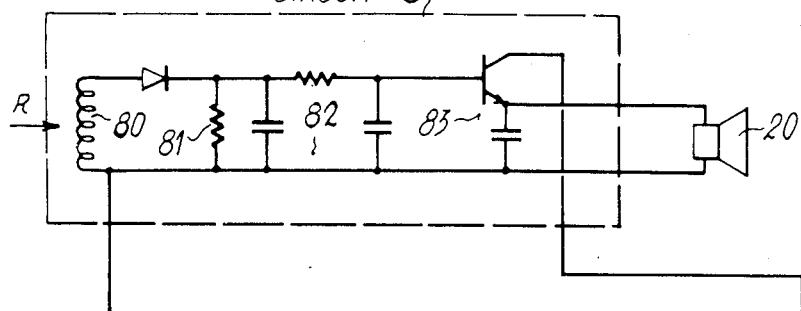
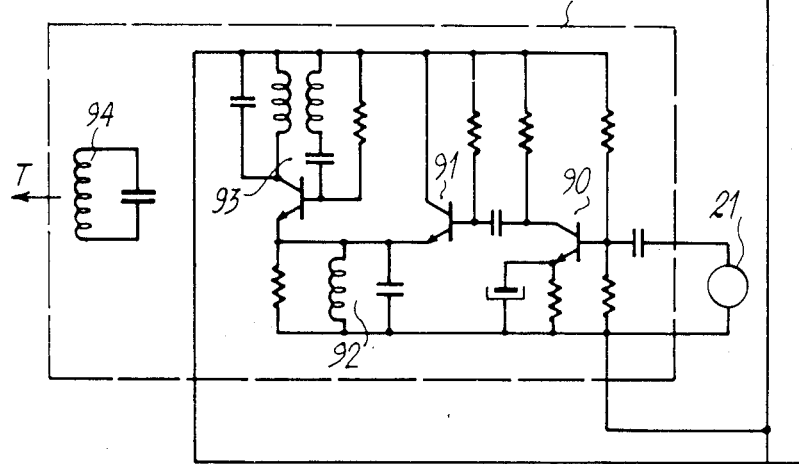
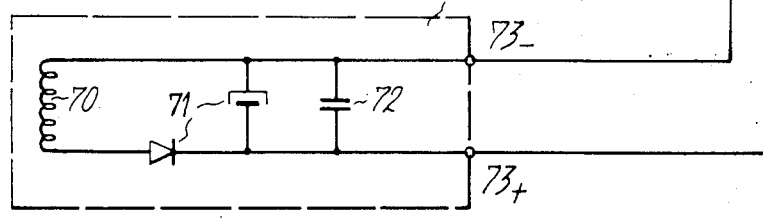

TELEPHONE APPARATUS WITH A FIXED TELEPHONE STATION COUPLED TO A MOBILE AND DETACHABLE HANDSET

BACKGROUND OF THE INVENTION

1 Field of the Invention

This invention relates to a telephone apparatus comprising a fixed station connected to a telephone line and a telephone handset, the handset being mobile and detachable with respect to the station.

2 Description of the Prior Art

Such a telephone apparatus is used as a public telephone, with a view of remedying main disadvantages of public telephones based on charge prepayment by coins or magnetic, holographic or memory card. The disadvantages are chiefly those connected with maltreatment of mechanical parts such as dial or keypad and telephone handset, with the possibility of blocking the coin or card slots such as to prevent prepayment for the telephone communication, and with the management of the money received, requiring the presence of coin container in the apparatus and periodic collection thereof when telephone communications are paid for in coins, or the sale of prepayment credit cards by special distributors when telephone communications are prepaid by card.

In a public telephone apparatus of the type defined above, for example as described in French Patent Application No. 2 538 978, a high frequency modulation circuit and a high frequency demodulation circuit included in the fixed station are respectively linkable to a high frequency demodulation circuit and a high frequency modulation circuit included in the handset through a bidirectional infrared link to transfer digital voice and tone signals between the station and the handset. Apart from the inconvenience to the user of having to keep his handset pointed towards two opto-electronic transducers embedded in the ceiling of a telephone booth containing the fixed station, throughout the duration of a telephone call, the infrared link may be disturbed either by a cutoff due to the passage of a foreign body or by movement of the handset, which interrupts the call in progress. Furthermore, the handset has a stand and power supply circuit, such as batteries, and the opto-electronic transducers contribute to an increase in the cost of the handset and the fixed terminal.

OBJECTS OF THE INVENTION

The main object of this invention is to remedy the preceding disadvantages and in particular to provide a telephone apparatus in which the link between the fixed station and the detachable handset is immune to disturbance.

Another object of this invention is to remote supply signal receiving and transmitting circuits included in the handset, from a power supply circuit included in the fixed station.

SUMMARY OF THE INVENTION

Accordingly, there is provided a telephone apparatus comprising a fixed station connected to a telephone line, and a handset including an earphone and a microphone, said station comprising first modulating means and said handset comprising first demodulating means, said first modulating and demodulating means being linkable through first low-frequency magnetic coupling means to transmit first audiofrequency signals from said telephone line to said handset earphone, and said handset comprising second modulating means and said station comprising second demodulating means, said second modulating and demodulating means being linkable through second low-frequency magnetic coupling means to transmit second audiofrequency signals from said handset microphone to said telephone line.

In practice, the coupling means are low-frequency voltage transformers each having two windings facing each other. Preferably, each of the magnetic coupling means comprises a coupling coil which is located behind an insulating face of the fixed station and another coupling coil which is located in an adaptor unit. The adaptor unit is connected to the handset by a flexible connection wire cord and is applicable against the fixed station, for example by means of a magnet contained in the adaptor unit working together with a magnet or electromagnet in the fixed station. This avoid all danger of external disturbance of the voice and tone signal transmission via the coupling means.

According to another feature of this invention, the station comprises means for transmitting a DC power supply voltage to the handset. The handset comprises means supplying the first demodulation means and the second modulation means for recovering the DC power supply voltage. The supply voltage transmitting and recovering means are linkable by third low-frequency magnetic coupling means. The handset takes the power supply voltage from the fixed station thus obviating the need for recharging or replacing a battery in the handset. In addition, remote supplying of the handset by the fixed station allows the presence of the handset placed against the fixed station to be checked with a view to telephone line seizure. This check is performed by detection of a "presence of a handset" signal delivered by the second demodulation means following transmission of a low-frequency carrier wave by the second modulation means and this being followed by remote supplying of the handset through the third magnetic coupling means.

In practice, the fixed station presents a perfectly flat vertical face flush with which are notably the coupling coils, a line seizure and release key, dialling keypad keys and a number display. The fixed station therefore has no projecting parts or orifices which could be vandalized.

BRIEF DESCRIPTION OF THE DRAWING

Further features and advantages of the invention will be apparent from the following more particular description of preferred embodiments of the invention as illustrated in the accompanying drawings in which:

FIG. 3 shows supply, demodulation and modulation circuits included in the handset.

DESCRIPTION OF THE PREFERRED EMBODIMENTS

Figure 1:
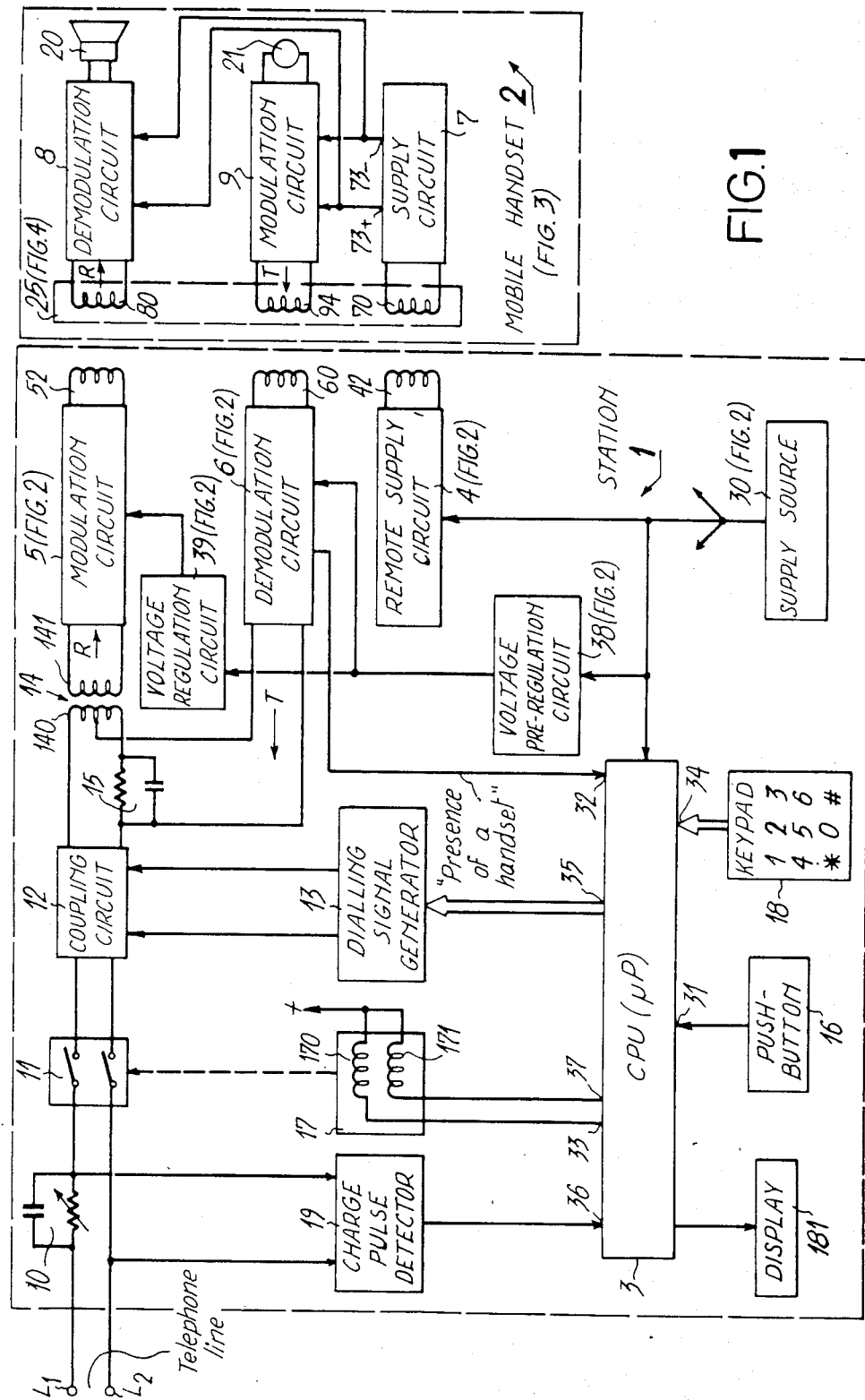
FIG. 1 is a block diagram of a fixed station and a mobile handset of a telephone apparatus embodying the invention.

A public telephone apparatus embodying the invention comprises a fixed station or post 1 and a mobile and detachable telephone handset 2. The station is first of all described in reference to FIG. 1.

Station 1 is connected to a telephone exchange (not shown) via a two-wire $L_1$ and $L_2$ telephone line. In station 1, there are circuits and components of a conventional telephone set, such as a line matching circuit 10 connected in series on wire $L_1$, one or two make contacts 11 connected in series on wires $L_1$ and $L_2$ respectively, acting as hook-commutator, a coupling circuit 12 coupling telephone line $L_1$ $L_2$ to a dialling signal generator 13, a differential transformer 14 sharing the telephone line into a first voice and tone signal receiving path R to be coupled to an earphone 20 in handset 2 and a second voice signal transmitting path T to be coupled to a microphone 21 in handset 2, and a line balancer 15 terminating the line. A primary winding 140 of transformer 14 is connected in series with balancer 15. Inputs to the receiving path R consist of the terminals of a secondary winding 141 of transformer 14. Outputs of the transmitting path T consist of a mid point of the primary winding 140 and a terminal of the balancer 15 connected to wire $L_2$ via coupling circuit 12 and one of the contacts 11.

Various steps of a telephone communication are managed and controlled by a central processing unit (CPU) 3 chiefly comprising a microprocessor. The station 1 is powered by a general power supply source 30 which provides a 24 V DC voltage from the mains or an accumulator battery, which, in another embodiment, can act as a standby battery in the event of a mains power interruption. The CPU 3 is manufactured using CMOS technology in order to reduce the electrical consumption of the station. The fixed station 1 also comprises a contact pushbutton 16 which, when pressed in, controls conventional hook-off, a bistable relay 17 having two windings 170 and 171 for controlling contacts 11, a 12-key dialling keypad 18, and a charge pulse detector 19 for detecting charge pulses modulated at 50 kHz or 12 kHz likely to be transmitted by the telephone exchange during establishment of a telephone communication.

The fixed station 1 is activated by an user by pressing the pushbutton 16 which triggers operation of the CPU 3 via input terminal 31. As will be seen subsequently, the CPU 3 controls telephone line seizure after checking correct coupling of the telephone handset 2 to the station 1, by means of detecting a "presence of a handset" signal delivered by transmitting path T to input terminal 32 of CPU 3. Line seizure is triggered by resetting of output terminal 33 of the CPU 3 which energizes the first winding 170 of relay 17 and closes contacts 11, thus simulating hook-off.

Responsive to a dial tone received in the earphone 20 of the handset via receiving channel R, the user dials various numbers on the keypad 18. For a charged call, the dialling step comprises the following in turn:

dialling of a predetermined number, such as "10", on keypad 18 to inform the exchange that the call to be established is charged, transmission of a number of telecommunication card in the user's possession, this number indicating a user's subscription account, transmission of a secret code number identifying the user, and a subscriber call number dialled on keypad 18.

The various numbers are delivered, for example, in digital form by an encoder in keypad 18 to an input bus 34 of CPU 3 which stores them in a RAM memory and then retransmits them via output bus 35 to dialling signal generator 13. In particular, CPU 3 does not order line seizure when the predetermined number "10" is not the first number dialled. According to the type of telephone exchange, the dialling signals are transmitted by generator 13 in the form of pulse trains or multifrequency signals. If, following the dial tone, the exchange does not recognize the predetermined number "10", the exchange then delivers on line $L_1$ $L_2$ a charge pulse which is detected by detector 19. Detector 19 asks CPU 3 to release line $L_1$ $L_2$ via input terminal 36. This release is obtained by applying a "0" to output terminal 37 of the CPU 3, thus activating the second winding 171 of relay 17 which opens contacts 11 and simulates hook-on.

After detection of the predetermined number "10", the user communicates to an operator in the exchange local the subscription account number written on the telecommunication card, then the secret code number so that the operator can check that the account number corresponds to the code number and if it does, charge the cost of the call to the user's account, this will then be shown on a bi-monthly bill received by him. If it does not, the operator cuts the connection and does not establish the communication and the exchange transmits a charge pulse to fixed station 1 in order to release the line, as described above. In another embodiment, the account number and the secret code number may be dialled on keypad 18 and transmitted by generator 13 via line $L_1$ $L_2$; the telephone exchange then automatically checks correspondence between the account number and the code number, and if discordance, transmits a charge pulse to detector 19. In any case, at the end of the communication, the telephone exchange retransmits the user's account number and the number of debited charge units and/or the cost of the call to a computer in a remote billing management centre, so that the user's bi-monthly bill can be prepared.

For an uncharged communication, for example corresponding to directory enquiries or emergency service such as police or fire brigade, a two-digit call number alone is dialled on the keypad 18 after the dial tone is received. In this case, the CPU 3 validates this call number and inhibits all charge pulse detection signalized by detector 19.

Figure 2:
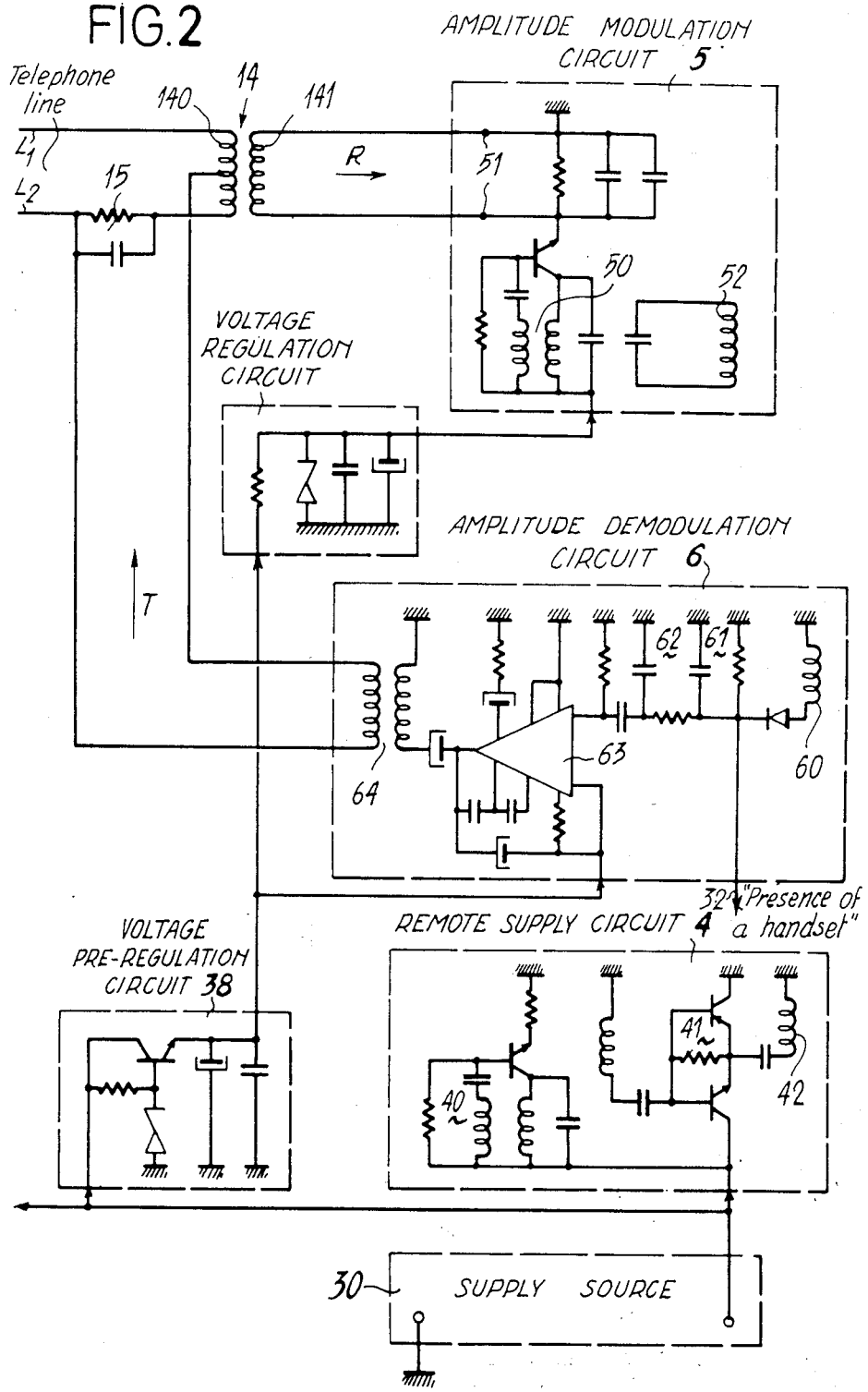
FIG. 2 shows remote supply, voltage regulation, modulation and demodulation circuits included in the station.

Referring to FIGS. 2 and 3, the receiving and transmitting paths R and T and the handset 2 to terminal 1 coupling are described in detail.

As shown in FIG. 2, station 1 comprises a remote power supply circuit 4, an amplitude modulation circuit 5 in receiving path R, and an amplitude demodulation circuit 6 in transmitting path T. As shown in FIG. 3, handset 2 comprises a power supply circuit 7, an amplitude demodulation circuit 8 in receiving path R and an amplitude modulation circuit 9 in transmitting path T.

Circuit 4 shown in FIG. 2 is designed to remotely supply the telephone handset 2, via a carrier wave having a predetermined low frequency of 100 kHz. Circuit 4 comprises a Hartley type oscillator 40 power supplied directly by the power supply source 30. The 100 kHz carrier is amplified by a series pseudo-push-pull circuit 41 having complementary junction transistors, and then is transmitted to handset 2 by a magnetic coupling coil 42. In circuit 7 of the handset shown in FIG. 3, the 100 kHz carrier is received by a magnetic coupling coil 70 and detected by a conventional diode and capacitor single-wave rectifier circuit 71. The rectified 100 kHz carrier charges a capacitor 72 at the output of circuit 7, acting as a power store. Plates of capacitor 72 constitute recovered DC power supply voltage terminals $73_+$ and $73_-$ to power circuits 8 and 9 in handset 2.

In station 1 as shown in FIGS. 1 and 2, modulation circuit 5 is supplied by source 30 via a voltage pre-regulation circuit 38 and a voltage regulation circuit 39, and demodulation circuit 6 is supplied by source 30 via the voltage pre-regulation circuit 38. Circuit 38 provides a higher power so that circuit 6 correctly transmits voice signals to telephone line $L_1 L_2$. Circuit 38 comprises a conventional junction ballast transistor having a base connected to a Zener diode, and at the output, a filtering capacitor and a buffer capacitor. Regulation circuit 39 stabilizes the power supply voltage at a relatively low voltage by means of a Zener diode and resistor circuit, and at the output, comprises a filtering capacitor and a decoupling capacitor.

In another more simple embodiment, but less secure against fraud, circuits 4 and 7 may be deleted, and circuit 7 can be replaced by an independent voltage source included in the handset, such as miniaturized batteries or accumulators.

In receiving path R, audiofrequency signals such as tone signals transmitted from the exchange and voice signals transmitted from a called subscriber set modulate a reception carrier having a low frequency of 200 kHz. The reception carrier is obtained via a Hartley type oscillator 50 included in circuit 5 and powered by regulation circuit 39, as shown in FIG. 2. A low frequency filter input 51 in circuit 5 receives the tone and voice signals through secondary winding 141 of differential transformer 14. An output of circuit 5 consists of a coupling coil 52 transmitting the amplitude modulated reception carrier to the handset 2. In amplitude demodulation circuit 8 of handset 1, shown in FIG. 3, a coupling coil 80 receives the modulated reception carrier which is demodulated in a detection circuit 81. The low-frequency signals detected by circuit 81 are filtered by a low-pass filter 82 and then are amplified in an amplifying circuit 83 having the earphone 20 as load.

In amplitude modulation circuit 9 shown in FIG. 3, microphone 21 delivers voice signals to two amplification stages 90 and 91. The amplified voice signals are then applied to a low-frequency filter input 92 of a tuned circuit comprising a Hartley type oscillator 93 delivering a trnsmission carrier having a low frequency of 250 kHz.

A coupling coil 94 at the output of circuit 9 transmits the transmission carrier that is modulated in amplitude by the microphone voice signals to a coupling coil 60 at the input of demodulation circuit 6 in fixed station 1. In amplitude demodulation circuit 6 shown in FIG. 2, a conventional detection circuit 61 and a low-pass filter 62 restore the microphone voice signals. A detection circuit 61 output is connected to input terminal 32 of the CPU 3 in order to signal a magnetic coupling of the handset 2 to fixed station 1, that is, remote powering of circuits 8 and 9 in the handset by source 30 via circuits 4 and 7. As already stated, this surveillance of the remote powering confirming the "presence of a handset" against the station 1 allows enabling of seizure of line $L_1 L_2$ when pushbutton 16 is pressed in at the beginning of a telephone communication.

In demodulation circuit 6, the detected and filtered microphone signals are amplified by a follower-amplifier 63 comprising an operational amplifier powered by the voltage pre-regulation circuit 38, before being transmitted on line $L_1 L_2$ via an isolation transformer 64 having transformation ratio of one.

Figure 4:
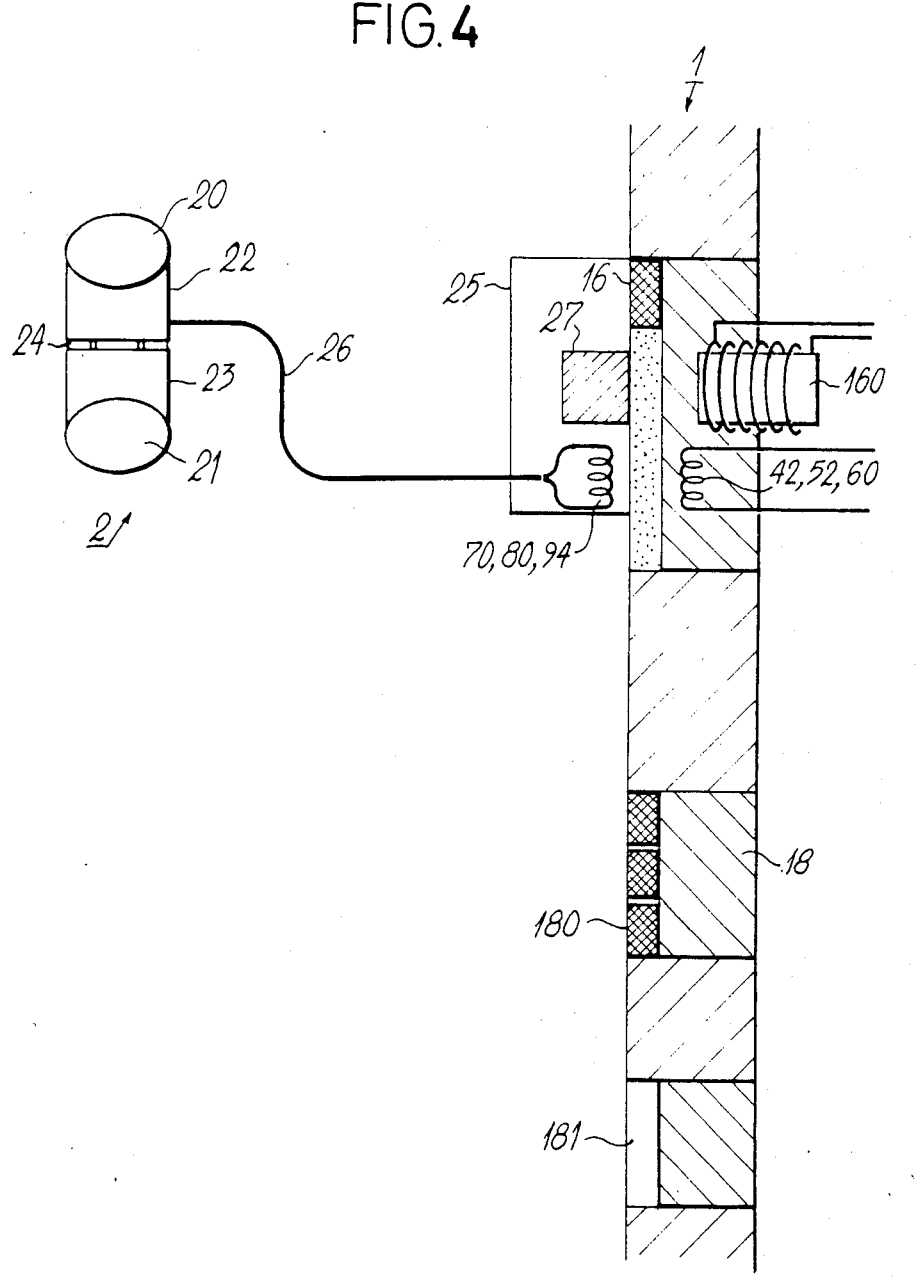
FIG. 4 is a schematic layout of the handset having an adaptor unit correctly applied against a vertical wall of the station.

According to a preferred embodiment schematically shown in FIG. 4, the handset 2 consists of a small folding housing comprising two small half-shells 22 and 23 which can be folded together by means of plastic flexible hinge 24. When the housing is closed, perforated grilles of the earphone 20 and the microphone 21 are opposite each other in the two half-shells 22 and 23. The housing contains all the electronic components of circuits 7, 8 and 9, with the exception of the magnetic coupling coils 70, 80 and 94 which are contained in an adaptor unit 25 linked to the handset housing via a flexible conductor-wire cord 26. Adaptor unit 25 also contains a magnetic member 27.

Fixed station 1 offers a completely smooth front surface which, in practice, forms a vertical wall of a public phone booth or part of a wall of a building. On the front surface is marked a plate in an insulating material, such as a hardwearing plastic. The insulating plate has an outline analogous to an adaptor unit 25 section so that the user simply applied the unit 25 against station 1. The unit 25 is held in place by a magnet, included in the vertical wall behind the plate, which attracts magnetic member 27. The station wall magnet may be replaced by an electromagnet 160 which is activated when pushbutton 160 is pressed. The above-mentioned plate also contains the pushbutton 16 in the form of a capacitive key. Thus, as soon as the adaptor unit 25 is applied to the station 1, coils 42 and 70, 52 and 80, 60 and 94 are magnetically coupled and, in particular, handset 2 is remote supplied. The CPU 3 detects the "presence of the handset" via terminal 32, and a line seizure request via terminal 31 is derived by the capactive key 16 acting as hook-off actuator. Removal of the adaptor unit 25 from station 1 disconnects the handset 2 from the general power supply source 30 and returns pushbutton 16 to the off position which orders the CPU 3 to release line $L_1 L_2$ via winding 171 of relay 17.

As also shown in FIG. 4, capacitive keys 180 of keypad 18 and, preferably an LCD display unit 181 connected to CPU 3 and designed to display dialled numbers are flush with the above mentioned wall of the station 1. The visible vertical wall of station 1 therefore offers no projecting points and no orifices likely to result in damage to the station.

What we claim is:

1. A telephone apparatus comprising a fixed station connected to a telephone line, and a handset including an earphone and a microphone, said station comprising first modulating means and said handset comprising first demodulating means, said first modulating and demodulating means being linkable through first low-frequency magnetic coupling means to transmit first audiofrequency signals from said telephone line to said handset earphone, and said handset comprising second modulating means and said station comprising second demodulating means, said second modulating and demodulating means being linkable through second low-frequency magnetic coupling means to transmit second audiofrequency signals from said handset microphone to said telephone line.

2. The telephone apparatus claimed in claim 1 wherein said station comprises means for transmitting a DC power supply voltage to said handset, and said handset comprises means supplying said first demodulation means and said second modulation means for recovering said DC power supply voltage, said supply voltage transmitting and recovering means being linkable by third low-frequency magnetic coupling means.

3. The telephone apparatus claimed in claim 2 wherein said supply voltage transmitting means comprises means for delivering a low-frequency carrier modulated by said DC supply voltage, and said supply voltage recovering means comprises rectifying means for detecting said supply voltage from the modulated carrier.

4. The telephone apparatus claimed in claim 1 wherein each of said first and second coupling means comprises first and second coupling coils, said first coupling coils being located behind an insulating face in said station, and said second coupling coils being located in an adaptor unit linked to said handset by a flexible conductor wire cord, said adaptor unit being applicable against said station.

5. The telephone apparatus claimed in claim 4 wherein said adaptor unit is held against said station face by a magnetic member contained in the adaptor unit acting together with a magnet member contained in the station.

6. The telephone apparatus as claimed in claim 4 wherein said station comprises a contact pushbutton for selectively requesting seizure and release of said telephone line via contacts inserted in said line, said pushbutton being pressed in when said adaptor unit is applied against said station to seize said telephone line.

7. The telephone apparatus as claimed in claim 1 wherein said station comprises means for transmitting a DC power supply voltage to said handset, and said handset comprises means supplying said first demodulation means and said second modulation means for recovering said DC power supply voltage, said supply voltage transmitting and recovering means being linkable by third low-frequency magnetic coupling means, and wherein said station comprises means for ordering a seizure of said telephone line in response to a station pushbutton being pressed in and in response to a signal delivered by said second demodulation means, said signal indicating remote supplying of said handset from said station via third magnetic coupling means.

8. The telephone apparatus as claimed in claim 1 wherein said station comprises means for releasing said telephone line in response to a charge pulse transmitted through said telephone line to said station.

9. A telephone apparatus comprising a fixed station connected to a telephone line, and a handset detachable with respect to said station,
said station comprising first modulation means connected to said telephone line, first demodulation means connected to said telephone line, remote supply means for transmitting a DC power supply voltage to said handset, and first, second and third low-frequency magnetic coupling coils connected to said first modulation means, said first demodulation means and said remote supply means respectively,
said handset comprising an earphone, a microphone, second demodulation means connected to said earphone, second modulation means connected to said microphone, supply means for supplying said second demodulation and modulation means, and fourth, fifth and sixth low-frequency magnetic coupling coils connected to said second demodulation means, said second modulation means and said supply means respectively,
said first modulating means and said second demodulating means being linkable through said first and fourth coupling coils to transmit audiofrequency signals from said telephone line to said earphone, said second modulating means and said first demodulating means being linkable through said fifth and second coupling coils to transmit audiofrequency signals from said microphone to said telephone line, and said remote supply means and said supply means being linkable through said third and sixth coupling coils to supply said second demodulation and modulation means by said supply voltage.

10. The telephone apparatus claimed in claim 9 wherein said first, second and third coupling coils are located behind an insulating face in said station, and said fourth, fifth and sixth coupling coils are located in an adaptor unit connected to said second demodulating means, said second modulating means and said supply means by a flexible conductor wire cord, said adaptor unit being applicable against said station.

11. The telephone apparatus claimed in claim 10 wherein said adaptor unit is held against said station face by a magnetic member contained in the adaptor unit acting together with a magnet member located behind said insulating face of said station.

12. The telephone apparatus as claimed in claim 11 wherein said station comprises a contact pushbutton located on said insulating face for selectively requesting seizure and release of said telephone line via contacts inserted in said line, said pushbutton being pressed in when said adaptor unit is applied against said station to seize said telephone line.

* * * * *